United States Patent [19]

Waite

[11] Patent Number: 5,075,011

[45] Date of Patent: Dec. 24, 1991

[54] COMPOSITE SEMIPERMEABLE MEMBRANE CREATED BY PRECIPITATION OF EMULSION POLYMERS ONTO BASE FILM MICROPOROUS SURFACES

[75] Inventor: Warren A. Waite, Burlington, Mass.

[73] Assignee: Ionics, Incorporated, Watertown, Mass.

[21] Appl. No.: 656,320

[22] Filed: Feb. 19, 1991

Related U.S. Application Data

[63] Continuation of Ser. No. 515,142, Apr. 26, 1990, abandoned.

[51] Int. Cl.$^5$ .................... B01D 61/02; B01D 61/14
[52] U.S. Cl. ..................................... 210/644; 210/654

[58] Field of Search .................. 210/500.35, 634, 640, 210/642, 644, 649–654, 500.1, 500.21, 500.27, 500.33–500.43

[56] References Cited

U.S. PATENT DOCUMENTS 4,913,816  4/1990  Waite ............................. 210/500.35

Primary Examiner—Frank Sever
Attorney, Agent, or Firm—Norman E. Saliba

[57] ABSTRACT

A composite semipermeable membrane having improved chlorine tolerance, produced by employing the development of a thin film polymer layer by precipitation of the polymer at the interface of an aqueous (or organic) liquid layer; and an aqueous emulsion polymer layer at or near the surface of a semiporous support or substrate. No chemical reaction is involved.

3 Claims, No Drawings

COMPOSITE SEMIPERMEABLE MEMBRANE CREATED BY PRECIPITATION OF EMULSION POLYMERS ONTO BASE FILM MICROPOROUS SURFACES

This application is a continuation of application Ser. No. 07/515,142, filed Apr. 26, 1990, now abandoned.

FIELD OF THE INVENTION

This invention relates to thin film composite membranes having substantial tolerance to chlorine or hypochlorites for use in the selective removal of solids from fluid mixtures or solutions. In particular, this invention relates to a dual layer membrane in which an ultra thin polymeric layer from a dispersed polymer (i.e. an emulsion or latex) is selectively deposited by precipitating same onto a microporous support layer. No chemical reaction is involved during the initial creation of the thin film composite layer although post chemical reactions are not ruled out in subsequent conditioning of the same. (i.e. crosslinking, etc.)

BACKGROUND OF THE INVENTION

Permselective membranes suitable for use in the desalination of aqueous solutions are the subject of numerous patents. Scala et al (U.S. Pat. No. 3,744,642) disclosed the method of creating a thin film permselective multilayer membrane composed of a microporous substrate onto which were deposited (at the interface between an aqueous layer and an organic layer), a polyamide, a polyester, or a polysulfonamide polymer. These were linear polymers created at or in the surface of the microporous support (aqueous phase filled with diol or diamines) by the direct reaction of diols or diamines with diacyl halides of the carboxyl or sulfonyl types contained in an organic phase such as ethylene dichloride or hexane. This initial composite membrane consisting of linear (but water immiscible) polyesters, polyamides, or polysulfonamides (reacted onto or near the surface of microporous polymers by interfacial polycondensation); were subsequently shown to de-salt saline water solutions with high flux rates due to the thinness of the chemically created barrier film. The microporous support served only to support this salt rejecting chemically created film called the "thin film" of a thin film composite membrane.

Cadotte (U.S. Pat. No. 4,277,344) discloses permselective multi-layer membranes in which there is a microporous polysulfone substrate layer and a juxtaposed polyamide layer made from an aromatic triacid halide such as trimesoyl chloride and the primary amine m or p phenylene diamine (or substituted m or p phenylene diamines). Here, thin films were created which were of the crosslinked type resulting from the direct interfacial condensation of trimesoyl chloride or mixtures of trimesoyl and phthaloyl chlorides from an organic phase, with an aqueous phase containing either m or p phenylene diamines or substituted m or p phenylene diamines.

Hara et al (U.S. Pat. No. 4,353,802) discloses semipermeable composite membranes in which the membrane material is crosslinked using polyfunctional aromatic acid halides. Kamiyama et al (U.S. Pat. No. 4,619,767) discloses permselective multi-layer membranes having (1) a microporous substrate layer (2) an ultra thin layer of a crosslinked polyvinyl alcohol/amino compound and (3) a porous inner layer of water insoluble polyvinyl alcohol located between the porous substrate and the ultra thin layer. Other patents disclosing the preparation and properties of thin film composites are U.S. Pat. Nos. 3,951,815; 4,005,012; 4,039,440; 4,872,984; 4,857,363; 4,853,122; 4,243,701; 4,259,183; 4,242,208; 4,761,234; 4,769,148; and 4,802,984.

Thin film composite (TFC) membranes appear to be the most efficient reverse osmosis (RO) membranes known today. Heretofore, these membranes have been most conveniently made by interfacial condensation polymerizations to yield ultra thin films of polyamides, at the interface of an aqueous phase layer and a non-aqueous or organic (solvent) phase layer. Since the two phases are substantially immiscible, a super thin film will be generated at the interface of the two liquid layers. Since the reaction, which draws reactants from both phases is diffusion controlled and self limiting, the method yields ultra thin films, typically 50-5000 Å thick.

Heretofore, such films (TFC's) were made upon, or just beneath the surface of a supporting microporous support film into which has been absorbed an aqueous diamine (or polyamine) solution; by simply placing the imbibed aqueous amino microporous substrate in contact with an organic solution containing a triacyl halide, a diacyl halide or a mixture of tri and diacyl halides. Reaction at only the interface yields the desired thin film polyamide; which, upon creation, forms a barrier whence no diamine can further contact any polyacyl halide contained in the organic phase. The creation of the thin film shuts down any further condensation polymerization.

An object of this invention is to produce a reverse osmosis (RO) or ultrafiltration (UF) membrane for use in the separation of salts, gases, liquids, solvents, and in the case of UF, small to medium sized molecules from mixtures in solution. The membrane is produced by causing a polymer dispersed (colloidially) in an emulsion to come out of its micellar phase and precipitate in such a manner as to form a thin film or barrier on a porous support, typically a polysulfone porous support.

The customary method used to make thin film composite RO membranes is to react a solution of an amine with a solution of an acyl halide or isocyanate to form a polymer at the interface of the two solutions containing their respective reactants. Such reactions proceed at high rates and the resulting thin film polymer is of varied molecular weight, thickness, and pore uniformity. In addition, in these interfacial polymerizations, the acyl chlorides, isocyanates, etc., employed to achieve phase separation, are customarily dissolved in an organic solvent that is often flammable (i.e. hexane) or a listed "suspect carcinogen" (i.e. ethylene dichloride).

The techniques of the present invention produce a film via coagulation, flocculation or precipitation of the emulsion solids by use of selected salts (NaCl, KCl, NaOAc, etc.) whether added directly or created by neutralization of the acid or base stabilized emulsion system by counter parts from the precipitating solution, or by simple evaporation. These emulsion precipitating techniques can also be accomplished at the interface between the organic and aqueous phases by neutralization and salting out (as depicted in the following equation) whence the stabilized emulsion (latex) polymer which is usually absorbed within the microporous support is precipitated at the interface by the generated $Na^+Cl^-$.

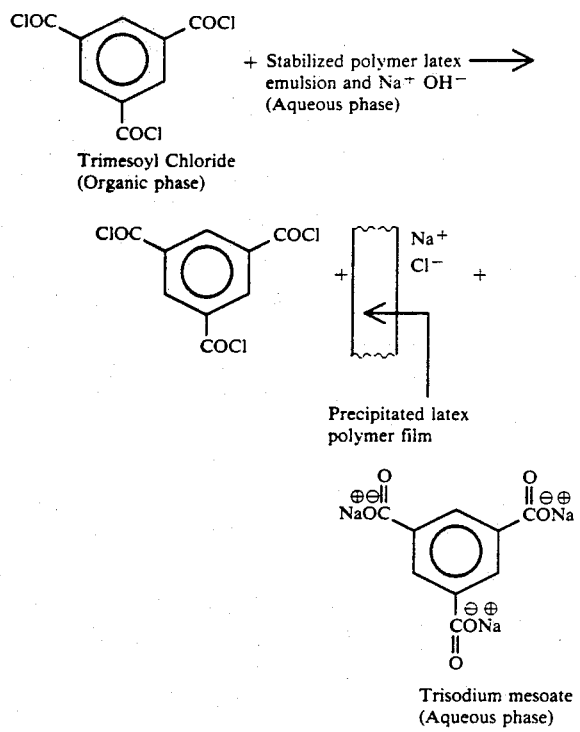

In other cases it may be desirable to use one of the solvents common to the usual production of TFC membranes. Even in these cases, however, the advantage of the present invention of having a preformed, tailor made polymer (not one of the random type often produced by the usual interfacial condensation polymerization) is considerable. In the case of vinyl and related polymers, it is historically known that the most desired polymers having the highest molecular weight and linearity are produced by micellar emulsion polymerization. Here again, by using this invention, we create a thin film of vinyl and related polymers, or copolymers, having in most cases the best in properties of uniformity, toughness, elongation, solvent resistance, color, etc.

The flocculation, coagulation, or precipitation of the polymer from the emulsion onto the porous support film may also be accomplished by gases or mists (HCl is an example). It may also be desirable to add certain ingredients such as sodium hydroxide to the emulsion system to facilitate the production of salts, such as sodium chloride or sodium acetate, when dipping into the coagulating solution.

BRIEF DESCRIPTION OF THE INVENTION

Any "reaction at interfaces" whence a material is drawn from one phase and caused to precipitate in the form of a barrier film of any type by a second material drawn from the second phase will give forth a thin barrier film. If this thin barrier film is preferentially deposited upon or slightly within, the surface of a microporous polymeric membrane surface, there results a thin film composite membrane. A thin film composite membrane made by the precipitation of a latex or emulsion polymer (but not restricted to, a vinyl polymer or vinyl copolymer) onto a microporous polyether sulfone substrate comprises the "major" object of this invention. A thin film composite membrane made by the precipitation of a latex of vinyl copolymers onto a microporous substrate and also having tolerance to chlorine or hypochlorite salts is also a major object of this invention.

The water or aqueous phase employed in the prior art typically contains only those ingredients that are water soluble such as for example, surfactants, diamines, polyamines, polyols, diols, acid acceptors and the like. In the fabrication of membranes of the present invention however there is added to the aqueous phase "water insoluble" ingredients in the form of a water emulsion or dispersion of natural or synthetic latexes or any other emulsifiable polymer comprised of normally water insoluble polymers or copolymers. The use of these latexes or emulsions makes possible the fabrication of non-condensation polymer thin film composite membranes. Thus thin film composite membranes can be formed without use of the reaction between an acyl halide (preferably di or triacyl) and a diamine or polyamine. In fact the membranes of the present invention can be created without any polymerization reaction at all. The thin film portion of the thin film composite (TFC) will comprise only the polymers contained in the aqueous phase dispersed emulsion or latex.

Such a TFC is novel and will have a multiplicity of novel types of creatable films; since the variety of polymeric materials making up the emulsion can be of infinite variety. The incorporation of emulsions into the aqueous phase of the membrane manufacturing system permits one to modify the physical and chemical properties of the TFC membrane systems and allow their use in more demanding thermal, mechanical, and chemical environments.

The number and types of emulsions (dispersions, latexes) that can be blended with water solutions of surfactants, caustic, etc. is almost limitless. The blending of copolymeric or polymeric emulsions with the desired water phase, usually imbibed within the interstices of any microporous support membrane such as polyether sulfone, etc. allows one to create a new type of thin film for the composite membrane.

Typically the use of styrene butadiene carboxylated emulsion would yield, upon precipitation, a film having water permeability (but still insoluble) and a highly desirable flexible thin film. The use of a polyvinyl fluoride or polyvinylidene fluoride emulsion would result in a membrane having improved chlorine resistance, improved stiffness/strength and/or reduced tendency to foul. (i.e. poor surface adhesion). In the practice of the present invention certain types of emulsions are extremely useful in the "precipitous" preparation of water transmittable thin films. Examples of such emulsion are as follows:
  a) Polystyrene-Butadiene Carboxyl Polymers
  b) Copolymers of Vinyl Chloride-Vinyl Alcohol
  c) Copolymers of Styrene-N Vinyl Carbazole
  d) Copolymers of Butadiene-N-Methyl Pyrrolidone
  e) Copolymers of Styrene-Acrylamide
  f) Copolymers of Vinyl Acetate-N Butyl Acrylamide
  g) Copolymers of Butadiene-Acrylamide
  h) Copolymers of Styrene-Butadiene-Hydrolyzed polyacrylonitrile
  i) Copolymers of Butadiene-Acrylonitrile When thin films composed of some of the above latices are deposited upon a microporous polysulfone film they will (because of their polar nature) be immediately transmittable for water molecules but not to salt molecules.

It is also possible for the resulting film to be crosslinked in place, after precipitation, by post reactions such as by:

a) De-"ol"ation (polyvinyl alcohol crosslinking)
b) Partial hydrolysis
c) Insolubilization by chemical reactions Other types of emulsions may also be selected to improve the membrane's flexibility, water transmission, adhesion to the microporous substrate and resistance to solvents, temperature and bacteria.

The properties and performance characteristics of the thin film composites is significantly determined by the ingredients in the aqueous phase system, i.e. all the water soluble components and the non-water soluble (but dispersable) emulsions.

The organic phase component historically used to make TFC membrane is no longer needed in the practice of this invention. As previously discussed, ingredients may now be contained in an alternate aqueous phase which upon contacting an aqueous emulsion phase; cause immediate precipitation of latex polymer. Thus, if a microporous polymeric film is soaked in an aqueous latex solution, blotted so as to present an imbibed latex loaded parellopiped membrane; then contacted with an aqueous solution containing soluble acids, bases, or salts (which will cause coagulative precipitation of imbibed latex only at the surface of the substrate) then we indeed create a thin film on the substrate. Such precipitating salts, acids, or bases destroy the stabilizing charges of the latex micelles causing them to precipitate or coagulate at the interface. The latex film that forms then prevents further reaction.

DETAILED DESCRIPTION

There is a general procedure for preparing thin film composite membranes. In the present invention however, there is no chemical polymerization employed to create the thin barrier film.

The procedures of Kamiyama, (U.S. Pat. No. 4,619,767) are somewhat illustrative of the general conditions needed for preparing composite membranes except that in the present invention no amine is used in the aqueous phase. Additionally in most cases there is no organic phase employed as previously described. In one of the aqueous phases, there is placed, instead, an emulsion which may consist of (but is not restricted to) the following specialty elastomers or latexes:

a) Polyvinyl chloride-Acrylic latex
b) Polyacrylate latex
c) Butadiene-Acrylonitrile polymer latex(Carboxy terminated)
d) Butadiene-Polystyrene-Polyvinyl pyridine latex
e) Polyurethane latex
f) Polyepichlorohydrin latex
g) Polychloroprene latex
h) Polyepichlorohydrin-Ethyleneoxide latex(-Polyether)
i) Ethylene-Propylene latex
j) Fluorinated rubber latex (Copolymer of vinylidene fluoride-hexafluoropropylene)
k) Polyvinyl chloride-Vinylidene chloride latex
l) Latex variety combinations A microporous substrate film with pores in the range of between about 0.005 to 0.5 microns in diameter is prepared. This may be accomplished preferably with a polysulfone, cast from a 15% solution in dimethyl formamide and immediately quenched in water to precipitate the polysulfone and extract the solvent. The substrate (dried and stored, or fresh and wet) is then loaded with the "water emulsion phase" solution containing the desired emulsion, hydroxides (or acids if emulsion is acid stabilized), etc.; and the excess solution removed from the surface by draining, rolling, or a sponging procedure. The concentration of the components in the "water emulsion phase" solution is an important factor in the performance of the resulting composite membrane.

The loaded substrate is then immersed in the "precipitating phase" solution which, when using a two phase (organic-aqueous emulsion) system, will contain the polyfunctional acyl or sulfonyl chloride, and, when using the one phase (aqueous-aqueous emulsion) system will contain solutions of salts, acids, or bases.

The "organic phase", if used, can be comprised of hexane, mixtures of hydrocarbons, chlorofluorohydrocarbons, ethylene dichloride, or any other organic material which will not have a dissolution effect upon the structure of the microporous base film membrane.

The immersion time (whether an organic or aqueous precipitating phase) is between about 5-90 seconds, preferably 30-60 seconds at room temperature. Formation of the precipitated latex at the surface of the microporous substrate which is imbibed with aqueous stabilized emulsion polymers, causes the originally shiny substrate to have a dull finish.

The resulting "thin film" composite membrane is then dried at temperatures of 10°-100° C., preferably 50°-70° C., for periods of 1 to 100 hours; preferably 24-96 hrs. to establish adhesion of the precipitated latex to the polysulfone substrate and dry out the composite membrane. Residual components and/or reaction by-products are thereafter extracted from the membrane by soaking in water prior to testing or usage.

The specialty latexes (emulsions), listed in part above, are dispersions of water insoluble, natural or synthetic polymers or copolymers where water is the continuous phase. The vast majority of synthetic latices are prepared directly by emulsion polymerization; are usually comprised of vinyl polymers or copolymers (but are not restricted to the vinyl class), and have particle sizes of between about 500-1500 Å (0.05-0.15 microns). A large number of commercially available latices, can be synthesized simply in the chemical laboratory and can be interblended, hence offering a wide multiplicity of materials that can be used to form the thin rejecting film of a composite membrane. As a result, one does not have to polymerize vinyl monomers into films with the difficulty of controlling a free radical, carbonium or carbonium vinyl polymerization at the interface of an organic and aqueous junction since two aqueous phases can be used instead. Such latices can include for example, acrylic latexes (aqueous anionic dispersions of copolymers of acrylic or methacrylic esters); nitrile latex (aqueous, anionic dispersions of butadiene-acrylonitrile copolymers); styrene-butadiene latexes, styrene-butadiene and vinyl pyridine terpolymer latexes, vinyl and vinylidene chloride copolymer latexes, resorcinol formaldehyde latexes, polyvinyl chloride-acrylic copolymer latexes, polyurethane latexes, fluorinated rubber latexes, polyether latexes, carboyl terminated styrene butadiene latexes, polychloroprene latexes, ethylene-propylene rubber latexes, polyvinyl acetate latexes etc. and various mixtures thereof.

These latexes are available whereby the polymers or copolymers therein vary as to their hardness, flammability, adhesive qualities, antioxident properties, temperature flexibility, chemical resistance, etc. The latexes are commercially available or can be very easily synthesized in the chemical laboratory. The terms latexes, emulsions and dispersions are used interchangably herein to have the same meaning.

No polymerized amide compounds are used in this present invention and hence no amine is employed to react with any organic substrate to form condensate polymers. Also polymerization is not used to create the thin film of the composite membrane, hence no monomers need be added to create:

a) Polyamides
b) Polyvinyl compounds
c) Polyureas
d) Polyurethanes
e) Polyesters
f) Other created polymers "in situ".

An exception to the above, is the possibility of adding monomers to the dispersed latex so as to have materials available to form graft crosslinks in the finished thin film composite.

ORGANIC PHASE/AQUEOUS PHASE LATEX PRECIPITATION

One type of composite semipermeable membrane is prepared according to the present invention by precipitating a polymeric latex out of an aqueous dispersion onto and/or into the surface or surface pores respectively of a microporous film of a polymeric structure (usually polysulfones), by precipitation of the dispersed latex onto said surface. This is effected by "salting out" the dispersed latex by using aqueous sodium chloride or other salts, bases, or acids supplied to the dispersed latex surface (at the surface of a latex solution microporous base film) either by chemical reaction of an organic moiety contained at or near the surface of an organic layer (used in this precipitating case) with water soluble sodium hydroxide as previously described.

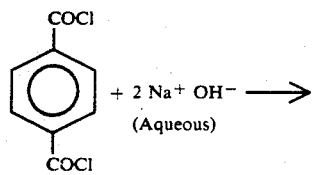

Terephthaloyl Chloride
(Organic phase)

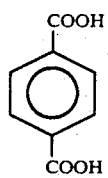

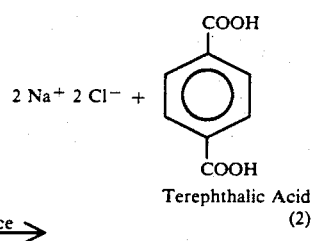

Terephthalic Acid (2)

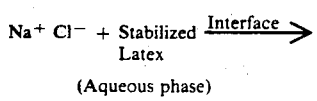

(Aqueous phase)

Latex Polymer + Salted-Out
Precipitate    latex stabilizer

Both of the above reactions (I and II) take place only at the organic/aqueous interface, with the thin latex film that is formed preventing further reaction.

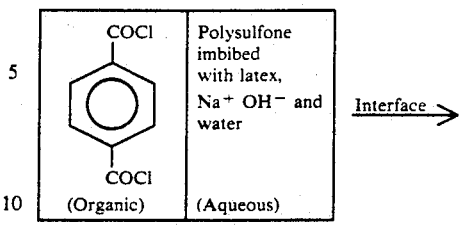

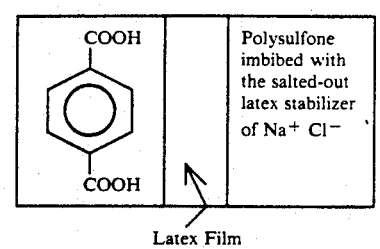

Latex Film

In many cases it is possible to use an aqueous solution of acids, salts or bases in place of the organic phase to produce this film as follows:

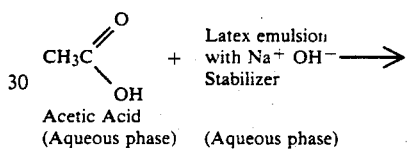

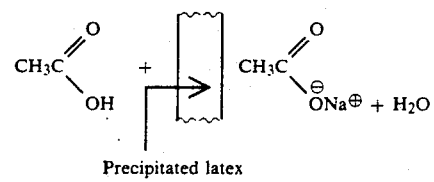

Precipitated latex
Polymer film

The reaction comprises an all water process without the need for any flammable or hazardous solvents to produce the thin film composite (TFC) membrane.

In the practice of this invention, one takes a commercial or specially made water based emulsion which has the desired polymer properties and immerses a microporous support film into the water based emulsion (latex). The latex solution will not contain any amine for conversion into a polymer. The resulting emulsion coated (or imbibed) microporous support film is then immersed, briefly, in a solution of salt, acid, or base; depending on which is best suited for de-stabilizing or precipitating the latex. This causes the emulsion (latex) to coagulate forming a thin film of the desired polymer on the microporous support film. Here, the salt, acid or base solution will have water as its solvent, thus a procedural system with minimum hazardous waste.

WATER PHASE/AQUEOUS PHASE LATEX DISPERSION

The dispersed aqueous latex may also be precipitated by a water phase soluble organic acid such as acetic acid by neutralization to sodium acetate, another excellent precipitant for base stabilized latex as shown below:

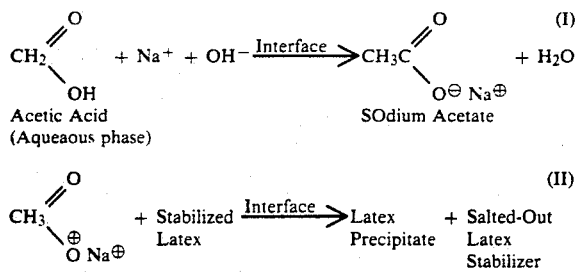

As previously described, both of the above reactions (I, II) take place only at the microporous membrane substrate/water-organic acid interface with the ultra thin precipitated latex film that is formed preventing further reaction. This is most desirable for the creation of the "thin film" of the composite membrane whereby the latex is precipitated by formed sodium acetate ions. The permutations and combinations of reactions at interfaces are infinite and succeed when a thin latex film is deposited at the interface in the 500–1500 Å thickness range of latex particles.

The composition of the latex also is variable and mutitudinous and thus allows thin film composite membranes to be created from a large variety of polymers; thus not restricted by the prior art to polyamides, polyesters, polysulfonamides, polyureas, polyurethanes, or other polymers created by the direct reaction of one or more monomers to form interfacial polymers.

If so desired, the deposited latex may be post crosslinked by ionizing radiation, free radical grafting, by a post chemical reaction of the double bond that is sometimes contained in the latex polymer or by a crosslinking reaction of appending groups co-valently attached to the latex polymer precipitated thin film(s).

As previously described, the present invention allows TFC membranes to be prepared, where there exists no organic layer (or phase). This is highly desirable in view of the fact that:

a) No flammable solvent is used.
b) No organic solvent is used which requires waste disposal and
c) No carcinogenic or "ozone" layer depleting chemical is used.

As was previously alluded to, the thin film of latex may be deposited by various interface phase separation methods such as the following:

1) Increasing the precipitating salt concentration of the aqueous phase imbibed at or near the surface of the microporous support film.
2) Evaporation of the surface of the support film to lay down a precipitated thin film.
3) Allowing acidic gas to precipitate latex at the aqueous/air interface and
4) Any other treatment which may cause the latex contained in the imbibed aqueous phase to precipitate at the air/water interface or water/ emulsion interface.

When latex precipitation has occurred, further growth of the newly created thin film may be stopped, or quenched, by immersion of the TFC into a dilute aqueous water phase thus rinsing out further latex reservoirs of polymeric material. This may be done before or after any drying step used during membrane preparation. In most of the specific examples which follow hereinafter, an aqueous phase solution is prepared with 0.5% sodium hydroxide and 1% latex of choice and in some examples with 1% magnesium hydroxide and 1% latex of choice.

The organic phase solution where used, consist of mixtures of trimesoyl chloride isophthaloyl chloride in hexane or other acid chlorides. If no organic precipitating bath is used but instead an aqueous precipitating bath is used then these will or may consist of 1% sodium aluminum sulfate solutions, 1% acetic acid solutions or 5% salt solutions, the latter of course being useful in either an acid or base stabilized latex solution. The latex solution which is usually imbibed within the microporous base or support film may contain a surface active agent for the purpose of reducing surface tension when coating or impregnating the porous substrate. The thickness of the ultrathin film depends upon the concentration of the latex component, the precipitating compound contained in either an organic phase or an aqueous acidic phase, and the contact time. The thickness is generally from 50 Å to 1000 Å, and preferably 100 Å to 500 Å. If the film is too thin, partial defects may develop on the film surface. Conversely, if the film is too thick, water permeability decreases and the membrane does not process enough desalted water in a given time to be a useful separation moiety.

The porous substrate used in the present invention is suitably a membrane having an asymmetric structure wherein the surface pore size is generally from between about 50 Å to 5000 Å. Polysulfone, polyvinylidene fluoride, polyvinyl chloride or copolymers of vinyl chloride with other vinyl moieties or cellulose esters may be used. Particularly, polysulfone or polyvinylidene fluoride is preferable. The porous substrate may be reinforced by a backing material of cloth or non-woven webs.

The latex thin film of this invention is not generally crosslinked but has, (depending on its structure) the ability to be crosslinked or vulcanized. If, for example, the latex is a copolymer of styrene and butadiene, then a small 1% (based on solid latex) quantity of vulcanizing agent may be coprecipitated within the latex. Such a vulcanizing agent could be an active rubber vulcanizer such as tetramethyl thiuram disulfide. Heating the finished thin film composite dry membrane at elevated temperature for a short period of time would crosslink the rubber via its residual double bond.

Also the use of latices with appending amino, carboxylate, or hydroxyl groups would allow crosslinkage by either immersion in di-isocyanate solutions or reacting with diepoxide or related chemicals. The use of glyoxal (a dialdehyde) would easily crosslink appending amine or hydroxyl groups covalently bound to the latex polymer so as to effect crosslinking of the thin film.

In the following examples the resulting composite membranes were all tested in a stirred R.O. test cell under 60 psi (of nitrogen) using a 300 ppm NaCl solution and a 150 ppm MgSO$_4$ solution. The flux rate was measured in gallons per sq. ft. of membrane per day (GFD). The results are shown in Table I.

EXAMPLE 1

A porous polysulfone substrate film on a woven polyester support fabric was evenly coated (by immersion) with an aqueous phase solution containing 0.375% by wgt. of styrene-butadiene latex polymer solids and 0.5% magnesium hydroxide.

It was then immersed for 30 seconds in an organic phase solution, that is, a n-hexane solution of 1% polyfunctional acylchloride mixture (0.4% by weight of trimesoyl chloride and 0.6% by weight of isophthaloyl chloride). The substrate was removed, allowed to dry in air and then allowed to sit for 4 days at room temperature before testing.

EXAMPLE 2

The same operation was carried out as in Example #1, except that the porous polysulfone film was immersed for 60 seconds into the n-hexane bath. The membrane was post dried and tested.

EXAMPLE 3

A porous polysulfone substrate film was evenly coated (by overnight immersion) with an aqueous (phase) solution containing 1% by wgt. of sodium aluminum sulfate-hydrate ($NaAl(SO_4)_2 \cdot 12 H_2O$). This imbibed "alum" loaded microporous substrate was immersed, (after blotting), into an aqueous solution of 1% styrene-butadiene latex and 0.25% sodium hydroxide for a period of 30 seconds. This illustrates a water phase-water phase reaction involving no organic solvents. The coated microporous membrane was dried overnight at room temperature.

EXAMPLE 4

The same operation was carried out as in Example #3 except that the "alum" imbibed microporous polysulfone membrane was immersed for 60 seconds into an aqueous latex bath. The coated membrane was dried for 5 days and then tested for R.O. properties.

EXAMPLE 5

The porous polysulfone substrate film was evenly coated (by overnight immersion) into a 1% acetic acid solution(HOAc) whence it was removed and sponge blotted. This membrane was then dipped for 30 seconds into a 1% styrene butadiene latex containing 0.125% NaOH. This was aqueous phase to aqueous phase. The substrate removed and dried at room temperature for 4 days. This composite membrane was tested for salt separation.

EXAMPLE 6

The same procedure as Example 5 except the dipped coagulation time was for 40 seconds and the drying was overnight at room temperature.

EXAMPLES 7 and 8

Composite membrane were fabricated using the same procedure as in Examples 3 and 5 respectively except that a polyvinyl chloride-acrylic latex was used (Geon ®460×46—B.F. Goodrich).

EXAMPLE 9

Example 3 procedure was repeated with one omission. The 1% latex was omitted from the 0.25% NaOH solution. This example proves that the RO membrane is dependent upon the precipitation of a thin film of latex on the surface of the microporous substrate.

EXAMPLE 10

The porous polysulfone support film was immersed in a 1% aqueous solution of hydrochloric acid for 20 minutes, drained to remove excess acid solution and then immersed in an emulsion of 1% butadiene styrene copolymer latex and 0.04% MgO. After drying at room temperature for 3 days the composite was cured for 90 minutes at 110° C. The resulting membrane was tested in the usual manner under 60 psi of ($N_2$)nitrogen.

TABLE I

| | Latex Precipitant | Latex Type | NaCl 300 ppm % Rejection | Flux (GFD) | Mg SO$_4$ % Rejection | 150 ppm Flux (GFD) |
|---|---|---|---|---|---|---|
| Example 1 | 1% Acylchloride (Hexane) | .375% Styrene Butadiene 0.5% Mg(OH)$_2$ | 45.4% | 10.2 | 43.1% | 8.7 |
| Example 2 | 1% Acylchloride (Hexane) | .375% Styrene Butadiene 0.5% Mg(OH)$_2$ | 20.6 | 44.9 | 19.0 | 51.1 |
| Example 3 | 1% "Alum" (Water) | 1% Styrene Butadiene 0.125% NaOH | 15.9 | 30.4 | 23.6 | 30.0 |
| Example 4 | 1% "Alum" (Water) | 1% Styrene Butadiene 0.125% NaOH | 25.2 | 22.6 | 33.7 | 22.0 |
| Example 5 | 1% HOAc (Water) | 1% Styrene Butadiene 0.125% NaOH | 24.8 | 30.7 | 27.8 | 30.0 |
| Example 6 | 1% HOAc (Water) | 1% Styrene Butadiene 0.125% NaOH | 28.4 | 31.7 | 31.4 | 27.7 |
| Example 7 | 1% "Alum" (Water) | 1% PVC-Acrylic .125% NaOH | 13.2 | 42.7 | 18.6 | 15.5 |
| Example 8 | 1% HoAc (Water) | 1% PVC-Acrylic .125% NaOH | 17.0 | 40.5 | 19.9 | 16.8 |
| Example 9 | 1% "Alum" (Water) | No latex 0.125% NaOH | 0.0 | 429.0 | 0.0 | 446.0 |
| Example 10 | 1% HCl (Water) | 1% Styrene Butadiene 0.04% MgO | 23.8 | 5.0 | 41.2 | 5.3 |

SODIUM HYPOCHLORITE TOLERANCE OF TFC MEMBRANES

Samples of membranes (Examples 11 to 14) were tested in a stirred R.O. test cell for rejection and flux rates in the usual manner.

Samples of the membranes were then placed into a diluted commercial bleach solution containing 1000 ppm NaOCl (a measured hypochlorite concentration of 1065 ppm). The pH of the solution was adjusted to 6.0±0.1 with 2N Hydrochloric acid. The bleach solution was replaced with fresh solution every 3 days over the exposure period.

The membranes were then retested after 425,000 ppm hypochlorite hours (exposure to 1000 ppm NaOCl for 425 hours). The % change obtained over the original rejection and flux rates are summarized in Table II. It should be noted that Example 11, 12 and 13 directed to membranes made by the process of the present invention showed a greater tolerance to hypochlorite exposure when compared against the standard type of commercial membrane (Example 14).

TABLE II

EMULSION TFC MEMBRANES STABILITY TOWARD 42500 PPM NaOCl HRS VS COMMERCIAL POLYAMIDE TFC RO MEMBRANE

| | Latex Precipitant | Emulsion Type | NaCl 300 Mg/l Rejection (% Change) | Flux (GFD) (% Change) | Mg SO$_4$ Rejection (% Change) | 150 Mg/l Flux (GFD) (% Change) |
|---|---|---|---|---|---|---|
| Example 11 | 5% Acylchloride (Hexane) | 1% Styrene-Butadiene 0.5% Mg(OH) | −18.5% | +133% | −34% | +168% |
| Example 12 | 2% HOAc (Water) | 1% Styrene-Butadiene 0.5% Mg(OH) | +21% | +54% | −6% | +60% |
| Example 13 | 1% HOAc (Water) | 1% Styrene-Butadiene 0.25% NaOH | +8% | +64% | −11% | +72% |
| Example 14 | Commercial TFC Membrane (Totally aromatic polyamide type) | | −92% | +216% | −88% | +132% |

Various modifications may be made to the procedures described herein as would be obvious to one having the ordinary skill in the art, and such modifications are considered to be included within the scope of the invention which is defined by the claims appended hereto.

I claim:

1. A process for treating water comprising providing a semipermeable membrane made by precipitating a dispersed polymer with a precipitating agent alone in the substantial absence of an amine compound, passing said water through said semipermeable membrane which membrane is characterized by comprising a porous substrate having on and/or in at least one surface thereof a continuous semipermeable film which film comprises as an essential part extending substantially throughout a predominant amount of water insoluble film-forming polymer formed on and/or in said at least one surface from a dispersion of said polymer.

2. A process according to claim 1 in which said membrane is further characterized by having a flux in the range of from about 5 to about 45 gallons per square foot per day when tested at 60 pounds per square inch gauge with water having about 300 parts per million sodium chloride.

3. A process for treating water comprising providing a semipermeable membrane made by precipitating a dispersed polymer with a precipitating agent alone in the substantial absence of an amine compound, passing said water through said semipermeable membrane which membrane is characterized by comprising a porous substrate having on and/or in at least one surface thereof a continuous, semipermeable film having a thickness not exceeding about 1500 Angstrom units which film comprises as an essential part extending substantially throughout a predominant amount of water insoluble film-forming polymer formed on and/or in said at least one surface from a dispersion of one or more water-insoluble, film-forming polymer selected from the group consisting of:

styrene-butadiene-carboxyl terpolymers
copolymers of vinyl chloride-vinyl alcohol
copolymers of styrene-N-vinyl carbazole
copolymers of styrene-acrylamide
copolymers of vinyl acetate-N-butyl acrylan
copolymers of butadiene-acrylamide
copolymers of hydrolyzed styrene-butadiene acrylonitrile
copolymers of butadiene-acrylonitrile
butadiene-acrylonitrile copolymers, carboxy terminated
butadiene-styrene-vinyl pyridine terpolymers
polyurethanes
epechlorohydrin-ethylene oxide copolymers
polyamides, polyureas, polyurethanes, polysulfonamides
polymers having appended amino, carboxylate and/or hydroxyl groups
polymers having a polar nature
mixtures thereof and derivatives thereof.

* * * * *